(12) United States Patent
Hopkins

(10) Patent No.: US 6,622,484 B2
(45) Date of Patent: Sep. 23, 2003

(54) HYSTAT/SPLIT TORQUE MODULATION

(75) Inventor: Michael F. Hopkins, Batavia, IL (US)

(73) Assignee: Caterpillar Inc., Peoria, IL (US)

( * ) Notice: Subject to any disclaimer, the term of this patent is extended or adjusted under 35 U.S.C. 154(b) by 281 days.

(21) Appl. No.: 09/747,915

(22) Filed: Feb. 2, 2001

(65) Prior Publication Data

US 2003/0005693 A1 Jan. 9, 2003

(51) Int. Cl.$^7$ .............................................. F16D 31/02
(52) U.S. Cl. .......................................... 60/468; 60/489
(58) Field of Search ................................. 60/468, 489

(56) References Cited

U.S. PATENT DOCUMENTS

| 3,132,533 | A |   | 5/1964  | Baker             |         |
|-----------|---|---|---------|-------------------|---------|
| 3,489,036 | A |   | 1/1970  | Cockrell et al.   |         |
| 3,672,167 | A | * | 6/1972  | Griesenbrock      | 60/468  |
| 3,988,949 | A |   | 11/1976 | Weseloh et al.    |         |
| 3,990,327 | A |   | 11/1976 | Margolin          |         |
| 4,024,775 | A |   | 5/1977  | Anderson et al.   |         |
| 4,043,227 | A |   | 8/1977  | Beals et al.      |         |
| 4,111,074 | A |   | 9/1978  | Northup           |         |
| 4,224,838 | A |   | 9/1980  | Roushdy et al.    |         |
| 4,347,765 | A |   | 9/1982  | Leonard et al.    |         |
| 4,355,509 | A |   | 10/1982 | Fulkerson et al.  |         |
| 4,885,955 | A |   | 12/1989 | Kraus             |         |
| 5,030,179 | A |   | 7/1991  | Ganoung           |         |
| 5,499,951 | A |   | 3/1996  | Showalter         |         |
| 5,607,372 | A |   | 3/1997  | Lohr              |         |
| 5,842,144 | A |   | 11/1998 | Coutant et al.    |         |

FOREIGN PATENT DOCUMENTS

| EP | 0249529   | A | 6/1987  |
|----|-----------|---|---------|
| EP | 0301896   | A | 7/1988  |
| EP | 0301918   | A | 8/1988  |
| GB | 2275761   | A | 3/1994  |
| JP | 050240343 | A | 9/1993  |
| JP | 100299862 | A | 11/1998 |

\* cited by examiner

Primary Examiner—Edward K. Look
Assistant Examiner—Michael Leslie
(74) Attorney, Agent, or Firm—Nexsen Pruet Jacobs & Pollard, LLP; James R. Smith

(57) ABSTRACT

An hydraulic pressure control system in the hydrostatic system of a split torque transmission uses a shunt circuit to redirect hydraulic fluid in a loop between a first pump and a second pump or motor. The shunt is opened by restricting a variable area or valve in the primary loop and opening a variable area or valve in the shunt. Adjusting the openings of the valves prevents overloading of the engine, lugging under instantaneous loads and overspeed due to backloading.

13 Claims, 1 Drawing Sheet

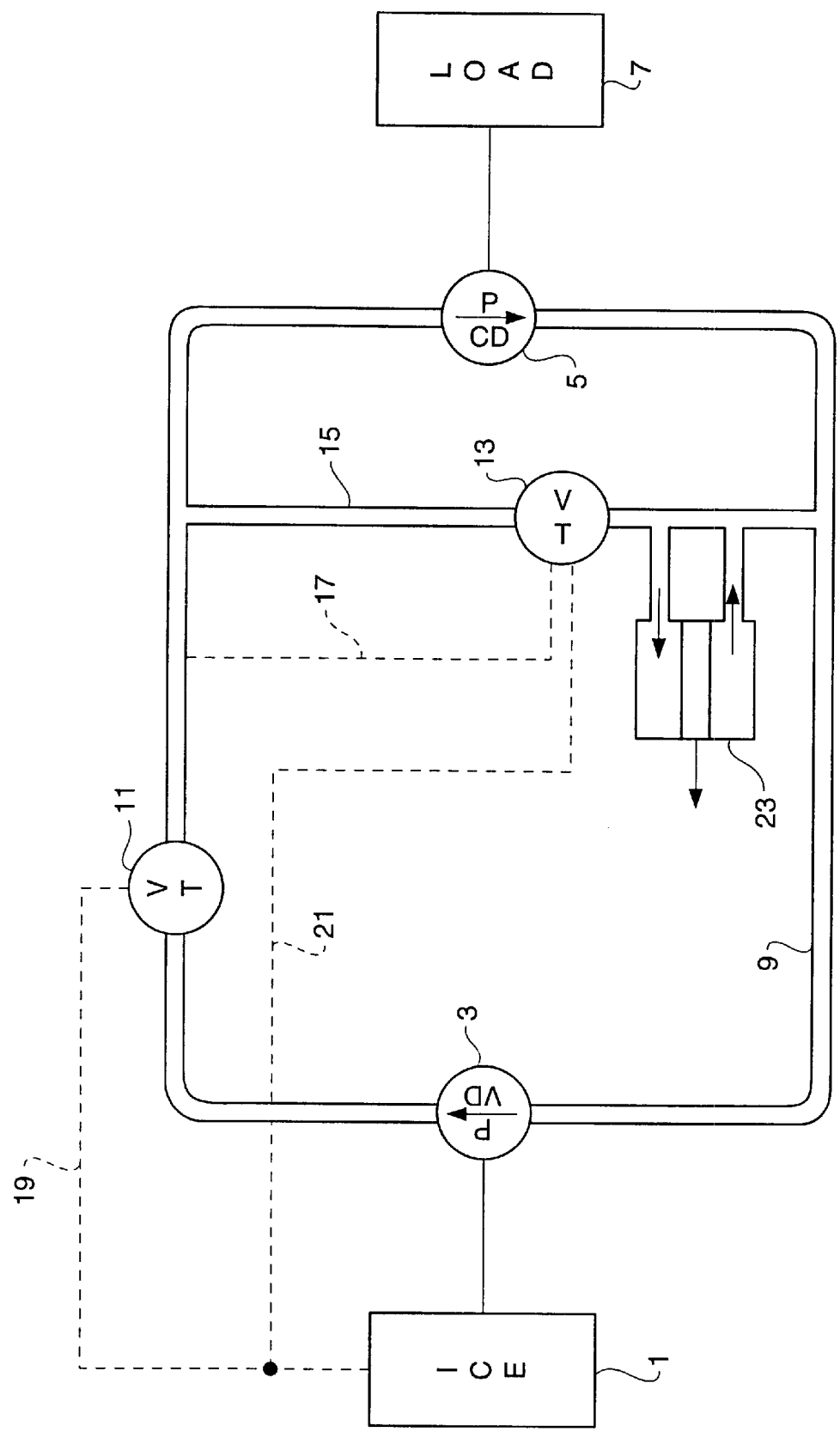

HYSTAT/SPLIT TORQUE MODULATION

TECHNICAL FIELD

This invention relates generally to pressure modulation in hydrostatic drive systems alone in split torque transmissions and more particularly to methods for the rapid adjustment of hydraulic pressure in a loop including a variable displacement hydraulic pump and a fixed or variable displacement hydraulic pump motor. The invention is useful to supplement the ranges of hydrostatic system response and particularly to respond to conditions outside the intended performance envelope which may develop more rapidly than the operator or equipment are expected to be responsive to.

BACKGROUND ART

Hydrostatic drive systems in split torque transmission employ a pressurized hydraulic loop to connect an engine to a driven element. The engine is not specifically limited, but the preponderance of vehicles and stationary devices using hydrostatic split torque transmissions also employ internal combustion engines and, typically, diesel engines. The diesel engine through drives an hydraulic pump, preferably a variable displacement pump which provides pressurized hydraulic fluids used to operate various components of the driven system. The hydraulic pressure may be used to drive a fixed or a variable displacement slaved pump or motor. The pump or motor may be connected to a gear box drive system of a split torque transmission and provides torque to move the vehicle. Such pump motors may also be used to drive winches or other rotating equipment. Under certain circumstances, load transferred from the driven elements may be backloaded to the slaved motor and result in unplanned or undesirable pressure changes within the system. The excursions may cause overspeed of the engine, excessive torque demand or lugging of the engine depending upon the direction and degree of the backloading.

U.S. Pat. No. 4,024,775 to Anderson et al., granted May 24, 1977, is directed to an hydrostatic mechanical transmission having an infinitely variable split torque. The transmission includes two hydrostatic units which may act, interchangeably, as motor and pump. The flow paths between the two units are fixed in length and diameter.

U.S. Pat. No. 5,842,144 to Coutant et al, granted Nov. 24, 1998, discloses an electronic control system for a split torque transmission which monitors and controls, inter alia, hydrostatic pump displacement controllers. The reference teaches the monitoring and control of variable displacement hydraulic pumps in the transmission, but does not disclose methods for controlling flow rates between the pumps.

The present invention is directed to overcoming one or more of the problems as set forth above.

DISCLOSURE OF THE INVENTION

The invention is directed to the inclusion of a shunt or loop in parallel with the primary hydraulic loop between a variable output hydraulic pump and a fixed or a variable displacement hydraulic pump motor in the hydrostatic system of a split torque transmission. One or more "variable areas" are used to control flow, one variable area being in the primary loop and a second variable area being in the shunt or parallel loop.

In a first aspect of the invention, the variable area of the shunt loop may be used as an hydraulic pressure control system to limit torque transfer by draining pressure from the primary loop.

In a second aspect of the invention, the shunt loop may be used to avoid lugging of the engine when increasing loads are placed on the engine or when very rapid load demands are made as nay occur when encountering an immovable object. The shunt loop variable area is opened reducing the load on the engine by directing hydraulic fluid through a lower resistance pathway.

In a third aspect of the invention, the variable area in the shunt loop may be used, in combination with a variable area in the primary loop, to avoid backloading to the engine by limiting the flow rate from a slaved motor on the load side of the loop to the variable displacement pump at the engine side of the loop. Reduction in the backloading to the engine prevents overspeed of the engine and of the variable output pump.

The "variable areas" according to this invention may be any flow restriction device or throttle which can be mechanically, hydraulically, pneumatically or electrically controlled. Activation is under the control of hydraulic line pressure and electronic signals obtained from the engine and other locations including those identified in U.S. Pat. No. 5,842,144.

BRIEF DESCRIPTION OF THE DRAWINGS

FIG. 1 shows those components of the split torque transmission relevant to this invention and the variable areas to which the invention is directed.

BEST MODE FOR CARRYING OUT THE INVENTION

This invention is directed to a modification of the hydraulic loop in the hydrostatic portion of an Hystat™ split torque transmission. Use of the modification changes the flow paths and flow rates within the hydrostatic system and may be used to protect the engine in the event of emergency or operator indiscretion.

As seen in FIG. 1, an engine 1 drives a variable output hydraulic pump 3 which is hydraulically connected to a fixed or a variable displacement pump or motor 5 through a primary hydraulic loop line 9. The motor 5 is connected, directly or indirectly, to the load side 7 of the transmission.

According to this invention, a first variable area or flow controller 11 (hereinafter valve 11) is the primary hydraulic loop 9. A shunt loop 15, located in parallel to that portion of the primary loop passing through the motor 5 has a second variable area or flow controller 13 (hereinafter valve 13). This latter valve is a parallel valve to motor 5 in contrast to the first valve which is a series valve.

The series valve 11 is under control of an angular velocity signal (RPM) derived from the engine. The parallel valve 13 is under the control of a pressure related signal 17 which is reflective of pressure within the primary loop 9 and/or of an angular velocity signal 21 derived from the engine.

Valves 11 and 13 may be manufactured to be within the housing of the hydrostatic portion of a split torque transmission. Likewise, line 15 may be bored into the housing. Alternatively, the primary loop 9 may be tapped and external piping employed. An additional component may be an heat exchanger 23 associated with shunt loop 15. Such a heat sink may be advantageous when the components illustrated in FIG. 1 are routinely used as described below.

Control of the hydraulic loop and operation of the variable displacement pump are under the control of a control device such as a microprocessor of the type disclosed in U.S. Pat. No. 5,842,144 or any other suitable control device.

Industrial Applicability

In hydrostatic systems, the torque limit is a function of system pressure and motor displacement. Using a variable displacement pump 3, the output can be ramped back in a conventional manner. When either a fixed or variable displacement motor 5 is employed, additional pressure limiting capacity is necessary to limit the maximum torque which is applied. Parallel valve 13 in the shunt loop 15 may be opened to provide a means for adjusting and varying the pressure and thus providing torque control. The degree of opening preferedly is responsive to pressure signal 17.

When pressure signal 17 exceeds a predetermined threshold, parallel valve 13 opens to reduce the total pressure in the system. The opening may be stepwise in response to a number of predetermined pressure settings or may be linear depending upon the type of control system. The angular velocity signal 21 serves as an override to ensure that the torque control through the opening of parallel valve 13 occurs only at appropriate times such as low engine speed and/or low pump flow conditions. The opening of parallel valve 13 would be minimized or overridden (i.e., valve remain closed) under high flow conditions which would generate excessive heat caused by the passage of oil through parallel valve 13. Use of an heat exchanger 23 make the system more dynamic.

Control of parallel valve 13 also may be used to control rimpull at the wheel when low traction is encountered. Rimpull control according to this invention would be coordinated with other systems which may be in use on the equipment.

The system is also useful to control short duration loads such as when a vehicle such as a wheel loader is penetrating a pile of material with its bucket. It is also useful when a vehicle is in motion and encounters a fixed object such as a rock covered with a looser aggregate material. Under such circumstance, the hydraulic system would transmit a load to the engine which would cause an instantaneous lugging of the engine. Opening of parallel valve 13 serves to dissipate the instantaneous hydraulic load and allow the engine to regain RPM to reach operating speed. In this situation, control of the parallel valve 13 would be determined by engine angular velocity or RPM signal.

The system also may be used as a type of brake valve to prevent engine overspeed. Engine overspeed is a condition in which the engine RPM becomes elevated as a result of backfeed of load from driven members such as wheels or tracks. Overspeed may cause valve damage in large diesel motors which typically are RPM limited to speeds no greater than 3000 RPM due to the design of the valve train and direct injection system. Under such a backfeed circumstance, the load 7 drives the pump 5 and the resultant pressure may overdrive the variable output pump 3. The variable output pump may be controlled to compensate for backfeed. According to this invention, the angular velocity signal 19 would indicate engine overspeed either by comparison with an absolute value or an increase in RPM greater than a threshold value within a sampling window. Series valve 11 then becomes restricted in response to the angular velocity signal 19 and the increase in pressure results in a pressure signal 17 which opens parallel valve 13.

The system using the brake valve to prevent overspeed operates almost instantaneously to avoid overspeed situations and may be useful in controlling a runaway vehicle or implement such as a large winch. As in the use of the parallel valve 13 for torque control, prolonged use of the shunt as a brake will result in a temperature increase in the short loop consisting of shunt loop 15 and that portion of the primary hydraulic loop 9 including motor pump 5. For this reason, it may be desirable to include within shunt loop 15 an oil-to-air or oil-to-water heat exchanger 23 external to the transmission casing.

Absent the necessity for an heat exchanger, the components of this invention may be included within the transmission and controlled using existing or slightly modified microprocessors as discussed in U.S. Pat. No. 5,842,144.

Other aspects, objects and advantages of this invention can be obtained from a study of the drawings, the disclosure and the appended claims.

What is claimed is:

1. A hydraulic pressure control system in the hydrostatic system portion of a split torque transmission comprising:
    a first variable area which controls flow rate in a portion of an hydraulic loop line between a variable output hydraulic pump and a fixed or variable displacement pump;
    a shunt across said hydraulic loop line around said fixed or variable displacement pump;
    a second variable area located in said shunt; and
    means to control said variable areas in response to sensed status signals form an engine and from said hydraulic loop line.

2. A hydraulic pressure control system according to claim 1 wherein said first and second variable areas are flow controllers.

3. A hydraulic pressure control system according to claim 2 wherein said controllers are valves.

4. A hydraulic pressure control system according to claim 1 wherein said means to control said variable areas includes a microprocessor.

5. A hydraulic pressure control system according to claim 4 wherein said microprocessor is responsive to at least one signal selected from the group consisting of an engine angular velocity signal and an hydraulic loop pressure signal.

6. A method to control torque output from a hydrostatic system of a split torque transmission system comprising:
    providing a shunt having a variable are across an hydraulic loop connecting a engine driven variable output pump and a fixed or variable displacement pump connected to a load;
    opening said variable area in response to pressure signal form said hydraulic loop; and
    modulating the opening of said variable area in response to an angular velocity signal from an engine.

7. A method to control torque output according to claim 6 wherein said load is a drawbar load.

8. A method to control torque output according to claim 6 wherein said load is a rimpull load.

9. A method to control torque output according to claim 6 wherein said load is a suddenly imposed load.

10. A method to control engine overspeed caused by backloading through a split torque transmission having a variable output hydraulic pump, a fixed or variable displacement motor pump and an hydraulic loop line connecting said pumps comprising shunting hydraulic fluid to reduce flow through said variable output pump in response to an engine angular velocity signal and a hydraulic loop pressure signal.

11. A method according to claim 10 wherein shunting of hydraulic fluid is accomplished by restricting said hydraulic loop line and opening a shunt pathway not including said variable output hydraulic pump.

12. A method to control torque output form a hydrostatic system of a split torque transmission system comprising:

providing a shunt having a variable area across an hydraulic loop connecting an engine driven variable output pump and a fixed or variable displacement pump connected to a load;

opening said variable said variable area in response to pressure signal form said hydraulic loop; and wherein said load is a drawbar load.

13. A method to control torque output from a hydrostatic system of a split torque transmission system comprising:

providing a shunt having a variable area across an hydraulic connecting an engine driven variable output pump and a fixed or variable displacement pump connected to a load;

opening said variable area in response to a pressure signal from said hydraulic loop; and wherein said load is a rimpull load.

* * * * *

UNITED STATES PATENT AND TRADEMARK OFFICE
CERTIFICATE OF CORRECTION

PATENT NO.     : 6,622,484 B2
DATED          : September 23, 2003
INVENTOR(S)    : Michael F. Hopkins It is certified that error appears in the above-identified patent and that said Letters Patent is hereby corrected as shown below:

Column 4,
Line 20, please correct to read as follows: -- means to control said variable areas in response to sensed status signals from an engine and from said hydraulic loop line. --
Line 23, please correct to read as follows: -- providing a shunt having a variable area across an hydraulic loop connecting an engine driven variable output pump and a fixed or variable displacement pump connected to a load; --
Line 41, please correct to read as follows: -- opening said variable area in response to a pressure signal from said hydraulic loop; and --
Line 66, a method to control torque output from a hydrostatic system of a split torque transmission system comprising: --

Column 5,
Line 5, please correct to read as follows: -- opening said variable area in response to a pressure signal from said hydraulic loop; and --

Column 6,
Line 1, please correct to read as follows: -- providing a shunt having a variable area across an hydraulic loop connecting an engine driven variable output pump and a fixed or variable displacement pump connected to a load; --

Signed and Sealed this

Twenty-seventh Day of April, 2004

JON W. DUDAS
*Acting Director of the United States Patent and Trademark Office*